United States Patent
Mukuno et al.

(10) Patent No.: US 6,632,265 B1
(45) Date of Patent: *Oct. 14, 2003

(54) NICKEL POWDER, METHOD FOR PREPARATION THEREOF AND CONDUCTIVE PASTE

(75) Inventors: Takashi Mukuno, Yamaguchi (JP); Takayuki Araki, Yamaguchi (JP); Yoshiharu Toshima, Yamaguchi (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,970

(22) PCT Filed: Nov. 10, 2000

(86) PCT No.: PCT/JP00/07937

§ 371 (c)(1),
(2), (4) Date: Oct. 9, 2001

(87) PCT Pub. No.: WO01/34327

PCT Pub. Date: May 17, 2001

(30) Foreign Application Priority Data

Nov. 10, 1999 (JP) ............................................. 11/320163

(51) Int. Cl.⁷ ................................................. C22B 23/00
(52) U.S. Cl. ............................. 75/739; 75/343; 75/362; 75/370; 75/371; 75/374
(58) Field of Search ................... 75/739, 343, 362, 75/370, 371, 374

(56) References Cited

U.S. PATENT DOCUMENTS 5,584,908 A * 12/1996 Scheie ......................... 75/348
6,162,277 A * 12/2000 Toshima et al. ............. 75/255

FOREIGN PATENT DOCUMENTS

| JP | A 60-238406 | 11/1985 |
| JP | A 63-274706 | 11/1988 |
| JP | 05043921 A * | 2/1993 |
| JP | A 11-152507 | 6/1999 |
| JP | A 11-189801 | 7/1999 |
| JP | A 11-302709 | 11/1999 |
| JP | 11302709 A * | 11/1999 |

OTHER PUBLICATIONS

Ryosuke Ueyama et al., "Preparation and Evaluation of Highly Monodispersed Ni Powders for Base Metal Internal Electrode of Multilayer Ceramic Devices," *Journal of the Ceramic Society of Japan*, V. 107, 1999, pp. 652–656.

* cited by examiner

Primary Examiner—Roy King
Assistant Examiner—Andrew Wessman
(74) Attorney, Agent, or Firm—Young & Thompson

(57) ABSTRACT

The nickel powder is characterized in that the rate of the nickel particles whose particle size is not less than 1.2 time the average particle size as determined by the observation with an SEM is not more than 5% of the total number of nickel particles and that the rate of nickel particles whose particle size is not more than 0.8 time the average particle size is not more than 5% of the total number of nickel particles. The nickel powder is produced by bringing a slurry, containing nickel hydroxide, which is prepared by adding an aqueous solution of a nickel salt to an aqueous solution of an alkali metal hydroxide, into contact with a hydrazine reducing agent under the temperature conditions of not less than 55° C. to reduce the nickel hydroxide.

4 Claims, No Drawings

NICKEL POWDER, METHOD FOR PREPARATION THEREOF AND CONDUCTIVE PASTE

TECHNICAL FIELD

The present invention relates to nickel powder, a method for the production of the nickel powder and a conductive paste for use in making a multilayer ceramic capacitor and more particularly to nickel powder, which has a narrow particle size distribution, which has a low content of the sum of impurities consisting of alkali metals, alkaline earth metals, transition metals belonging to the fourth period of the Periodic Table (except for nickel), sulfur and chlorine and which is, in particular, suitably used as a conductive paste for use in making a thin inner electrode, free of any projection, for a multilayer ceramic capacitor as well as a method for the production of the nickel powder and a conductive paste for use in making a multilayer ceramic capacitor.

BACKGROUND ART

A multilayer ceramic capacitor comprises a plurality of layers of a ceramic dielectric substance and a plurality of inner electrode,layers, which are alternately laminated and united and such a multilayer ceramic capacitor is in general produced by preparing a conductive paste by converting metal fine powder as an inner electrode material into a paste, printing a green sheet of a ceramic dielectric substance with the resulting conductive paste, laminating a plurality of the printed green sheets in such a manner that the ceramic dielectric green sheet and the conductive paste are arranged alternately, pressing the laminated printed green sheets with heating to thus unite them, and then firing the resulting assembly at a high temperature in a reducing atmosphere to thus unify the ceramic dielectric layers and the inner electrode layers.

As the inner electrode material, there has conventionally been used, for instance, platinum, palladium or silver-palladium, but there have recently been developed techniques, which make use of base metals such as nickel in place of precious metals such as platinum, palladium and silver-palladium in order to save the production cost and these techniques have been advanced.

Moreover, electronic parts produced by using conductive pastes such as multilayer ceramic capacitors have recently been more and more miniaturized and the ceramic dielectric layer and the inner electrode layer have correspondingly been more and more thinner and the number of these layers laminated has been increased. Accordingly, there have presently been produced a laminated part such as a multilayer ceramic capacitor in which the thickness of the dielectric layer is not more than 2 $\mu$m, the thickness of the inner electrode layer is not more than 1.5 $\mu$m and the number of layers laminated is not less than 100.

It may be satisfactory to use metal fine powder having a small average particle size balanced with the thickness of the inner electrode layer in order to obtain a thinner inner electrode layer. However, coarse particles may be present in such metal fine powder even if the average particle size of the powder falls within the desired range. Accordingly, if an inner electrode layer is formed by using a conductive paste containing such metal fine powder, the coarse particles present therein may form projections on the resulting inner electrode layer, the projections may in turn break through the thin ceramic dielectric layer to thus form a short-circuit between the neighboring inner electrode layers. Accordingly, to prevent the formation of any short-circuit between inner electrode layers, it is necessary to use metal fine powder having an average particle size substantially smaller than that balanced with the thickness of such a thin inner electrode layer.

For instance, Japanese Un-Examined Patent Publication No. Hei 11-189801 discloses nickel ultra-fine powder whose average particle size ranges from 0.2 to 0.6 $\mu$m and in which the rate of coarse particles having a particle size of not less than 2.5 times the average particle size is not more than 0.1% based on the number of particles and further discloses in the fourth column, lines 21 to 24 that "If the particle size of coarse particles is limited to, for instance, about 1.5 $\mu$m, the average particle size of the ultra-fine nickel powder according to the present invention should accordingly be limited to 0.6 $\mu$m". Thus, it is necessary to use metal fine powder having a considerably small average particle size in order to produce a thin inner electrode layer. However, problems arise such that the finer the metal fine powder, the higher the viscosity of a paste containing such fine powder and that the heat shrinkage of the printed paste layer and the oxidation of the nickel powder included therein are accelerated upon firing the printed green sheet.

It is thus an object of the present invention to provide nickel powder, which has a narrow particle size distribution, which has a low content of total or overall impurities consisting of alkali metals, alkaline earth metals, transition metals belonging to the fourth period of the Periodic Table (except for nickel), sulfur and chlorine and which can suitably be converted into a conductive paste for forming a thin inner electrode layer free of any projection for use in making a multilayer ceramic capacitor without unnecessarily reducing the particle size of the nickel fine powder, as well as a method for the production of the nickel powder and a conductive paste, which contains such nickel powder and which is used for the manufacture of a multilayer ceramic capacitor.

DISCLOSURE OF THE INVENTION

The inventors of this invention have conducted various studies to achieve the foregoing object, have found that if the content of coarse particles present in nickel powder is reduced to a relatively low level and if the particles are so designed that most of them have a particle size falling within a desired range, an inner electrode layer free of surface projections can be produced without unnecessarily reducing the particle size of the nickel powder, that the resulting multilayer ceramic capacitor hardly forms a short circuit between the neighboring inner electrodes, can inhibit any oxidation of the inner electrodes because of a low content of fine particles and is free of any heat shrinkage, that such nickel powder can be produced if desired conditions are satisfied when producing nickel hydroxide and reducing the same and that a conductive paste containing such nickel powder is particularly suitably used for forming a multilayer ceramic capacitor and thus have completed the present invention.

Accordingly, the nickel powder of the present invention is characterized in that the rate of the nickel particles whose particle size is not less than 1.2 time the average particle size as determined by the observation with an SEM (scanning electron microscope) is not more than 5% of the total number of nickel particles and that the rate of nickel particles whose particle size is not more than 0.8 time the average particle size is not more than 5% of the total number of nickel particles.

Moreover, the conductive paste according to the present invention is characterized in that it comprises the foregoing nickel powder according to the present invention.

In addition, the method for the production of nickel powder according to the present invention comprises the step of bringing a slurry, containing nickel hydroxide, which is prepared by adding an aqueous solution of a nickel salt to an aqueous solution of an alkali metal hydroxide, into contact with a hydrazine reducing agent under the temperature condition of not less than 55° C. to thus reduce the nickel hydroxide.

BEST MODE FOR CARRYING OUT THE INVENTION

The nickel powder of the present invention has a rate of the nickel particles whose particle size is not less than 1.2 time the average particle size as determined by the observation by an SEM with a magnification of ×10000 for the sake of convenience, of not more than 5% and preferably not more than 4% of the total number of nickel particles and a rate of nickel particles whose particle size is not more than 0.8 time the average particle size of not more than 5% and preferably not more than 4% of the total number of nickel particles. In other words, the rate of coarse particles present, in the nickel powder is relatively low and thus the particle sizes of individual nickel particles present in the nickel powder are considerably uniform. Therefore, each inner electrode layer used in, for instance, a multilayer ceramic capacitor produced by using a conductive paste, which contains such nickel powder, may have a considerably thin thickness as compared with the average particle size of the nickel powder and may have a surface almost free of any projection. Accordingly, the resulting multilayer ceramic capacitor never causes any short circuit between the neighboring inner electrodes. In addition, the nickel powder of the present invention has a relatively low rate of fine particles and therefore, the paste containing such nickel powder never suffers from such problems that the paste has a high viscosity and that the heat shrinkage of the paste layer and the oxidation of the nickel particles included therein are accelerated during firing the printed green sheet.

In the nickel powder of the present invention, when the nickel powder is dispersed in a liquid, followed by calculating the particle size ($D_{50}$) corresponding to a cumulative distribution of undersize particles equal to 50% and the maximum particle size ($D_{max}$) in the particle size distribution, obtained by determining the volume distribution according to the laser diffraction scattering method, the value ($D_{max}/D_{50}$) is preferably not more than 4 or the ratio of $D_{max}$ to $D_{50}$ is preferably not more than 4, more preferably not more than 3 and most preferably not more than 2.5. In this connection, the foregoing determination of the particle size distribution desirably comprises the steps of sufficiently dispersing nickel powder in a desired dispersant aqueous solution, stirring the resulting dispersion with an ultrasonic dispersion device and then determining the particle size distribution using an appropriate laser diffraction scattering type particle size distribution-determining device.

Regarding the nickel powder of the present invention, if the rate of the nickel particles, whose particle size is 1.2 time the average particle size as determined by the observation of the nickel powder with an SEM, is not more than 5% of the total number of the nickel particles, the rate of the nickel particles, whose particle size is 0.8 time the average particle size as determined by the observation thereof with an SEM, is not more than 5% of the total number of the nickel particles and the ratio of $D_{max}$ to $D_{50}$ is preferably not more than 4, the formation of projections on the surface of each inner electrode layer can more sufficiently be prevented in, for instance, a multilayer ceramic capacitor produced by using a conductive paste, which contains such nickel powder, and it is also possible to form an extremely uniform, compact and thin film. Accordingly, the formation of any short circuit between the neighboring inner electrodes can likewise be more sufficiently inhibited in the resulting multilayer ceramic capacitor.

In respect of the nickel powder of the present invention, when a multilayer ceramic capacitor is produced by using a paste containing such nickel powder, the powder preferably has an average particle size, as determined by the SEM observation, ranging from 0.1 to 1 μm and more preferably 0.2 to 0.6 μm.

Moreover, in the production of the nickel powder according to the present invention, it is possible to reduce, to a level of not more than 600 ppm, the content of overall impurities consisting of alkali metals, alkaline earth metals, transition metals (except for nickel) belonging to the fourth period of the Periodic Table (titanium, vanadium, chromium, manganese, iron, cobalt, copper and zinc), sulfur and chlorine, by the use of high purity reagents and by satisfying the following desired requirements during the formation of nickel hydroxide and during reducing the nickel hydroxide. These impurities have a tendency of suppressing or accelerating the sintering during the production of a multilayer ceramic capacitor and a tendency of lowering the dielectric breakdown voltage of the resulting multilayer ceramic capacitor. In other words, they have a tendency of adversely affecting the electric characteristics of the resulting ceramic capacitor and therefore, it is quite significant to be able to reduce the total amount of these impurities to a level of not more than 600 ppm.

As has been discussed above, the nickel powder of the present invention has a narrow particle size and a low total content of impurities consisting of alkali metals, alkaline earth metals, transition metals belonging to the fourth period of the Periodic Table (except for nickel), sulfur and chlorine and may be used in a variety of applications. Even when the nickel powder is used in the production of, in particular, an inner electrode for a multilayer ceramic capacitor, the powder may have such conspicuous effects that it can be formed into a thinner layer and can impart a high capacity to the resulting multilayer ceramic capacitor without unnecessarily reducing the particle size thereof and that it can inhibit the formation of substandard products.

Moreover, the conductive paste for use in making a multilayer ceramic capacitor according to the present invention comprises the nickel powder of the present invention, which can satisfy the requirements discussed above. Thus, the conductive paste of the present invention for use in making a multilayer ceramic capacitor is particularly favorably used for forming a thin and uniform inner electrode since the paste comprises the nickel powder having the foregoing excellent characteristics and the paste permits the prevention of any deterioration of the electrical properties and any scattering of the quality of the resulting multilayer ceramic capacitor.

Then a preferred method for the preparation of the conductive paste of the present invention for use in making a multilayer ceramic capacitor will be described below.

The conductive paste of the present invention for use in making a multilayer ceramic capacitor is composed of, for instance, the aforementioned nickel powder of the present invention, a resin and a solvent and further comprises, if necessary, additives such as a dispersant and/or a sintering-inhibitory agent. More specifically, resins usable herein are, for instance, cellulose derivatives such as ethyl cellulose, vinyl non-curing resins such as acrylic resins, polyvinyl butyral resins and polyvinyl alcohols, and thermosetting resins preferably used in combination with peroxides such as epoxy and acryl. In addition, solvents usable herein are, for instance, terpineol, tetralin, butyl carbitol and carbitol acetate, which may be used alone or in any combination. The paste may, if necessary, comprise glass frits. The conductive paste of the present invention used in the production of a multilayer ceramic capacitor may be prepared by mixing and stirring the foregoing ingredients by using a mixing device such as a ball mill or a three-roll mill.

The method for the production of nickel powder according to the present invention comprises the step of bringing a slurry, containing nickel hydroxide, which is prepared by adding an aqueous solution of a nickel salt to an aqueous solution of an alkali metal hydroxide, into contact with a hydrazine reducing agent under the temperature condition of not less than 55° C. to thus reduce the nickel hydroxide. In this connection, examples of nickel salts usable herein are nickel sulfate, nickel nitrate and nickel halide such as nickel chloride, examples of alkali metal hydroxides usable herein are sodium hydroxide and potassium hydroxide and examples of hydrazine reducing agents usable herein are hydrazine, hydrazine hydrate, hydrazine sulfate, hydrazine carbonate and hydrazine hydrochloride.

In the production method according to the present invention, it is important to use a slurry containing nickel hydroxide, which is prepared by adding an aqueous nickel salt solution to an aqueous solution of an alkali metal hydroxide. This is because if an aqueous nickel salt solution is added to an aqueous solution of an alkali metal hydroxide, nickel powder whose particle size is uniform can be prepared since the viscosity of the slurry is low upon the precipitation of nickel hydroxide, while if an aqueous solution of an alkali metal hydroxide is added to an aqueous nickel salt solution, the viscosity of the slurry increases upon the precipitation of nickel hydroxide, and this makes the formation of nickel powder having a uniform particle size quite difficult.

In the production method according to the present invention, the aqueous nickel salt solution is preferably gradually added to the aqueous alkali metal hydroxide solution to thus give a nickel hydroxide-containing slurry and the slurry is immediately brought into contact with the hydrazine reducing agent. However, even when the aqueous nickel salt solution is preferably gradually added to the aqueous alkali metal hydroxide solution to thus give a nickel hydroxide-containing slurry, followed by allowing the resulting slurry to stand or storing the same to thus separate out at least part of nickel hydroxide, the mixture can sufficiently be stirred to return it to a complete slurry condition and then brought into contact with the hydrazine reducing agent. Alternatively, it is also possible to form a nickel hydroxide-containing slurry by preferably gradually adding the aqueous solution of a nickel salt to an aqueous solution of an alkali metal hydroxide, to recover the nickel hydroxide from the slurry in the wet or dry condition, to store the same, to then add water and an alkali metal hydroxide to the recovered product, to sufficiently stir the mixture to thus return it to a strongly alkaline slurry condition and to then bring the slurry into contact with a hydrazine reducing agent.

The concentration of the aqueous nickel salt solution used in the preparation of the foregoing nickel hydroxide-containing slurry preferably ranges from 10 to 150 g/L and more preferably 50 to 150 g/L as expressed in terms of the nickel ion concentration. The use of an aqueous nickel salt solution having such a concentration permits the achievement of such a narrow particle size distribution peculiar to the nickel powder of the present invention and simultaneously leads to the achievement of preferred results such as good production efficiency.

The concentration of the aqueous alkali metal hydroxide solution used in the preparation of the foregoing nickel hydroxide-containing slurry preferably ranges from 20 to 300 g/L and more preferably 60 to 250 g/L. In addition, the amount of the aqueous nickel salt solution relative to that of the aqueous alkali metal hydroxide solution is such that the amount of the alkali metal hydroxide present in the aqueous alkali metal hydroxide solution is preferably 1.1 to 2 eq. and more preferably 1.3 to 1.8 eq. per one eq. of the nickel salt present in the aqueous nickel salt solution. It is thus preferred to use these ingredients in such relative amounts to ensure the stable formation of nickel hydroxide and to simultaneously achieve well-balanced cost performance.

In the production method according to the present invention, it is very important that the nickel hydroxide-containing slurry is brought into contact with a hydrazine reducing agent at a temperature of not less than 55 to thus reduce the nickel hydroxide. If the reduction is carried out at a temperature of less than 55° C., it is difficult to obtain nickel powder having a uniform particle size and the resulting powder comprises a large amount of coarse nickel particles. Moreover, alkali metals as impurities are mixed in the resulting nickel powder in a high rate. Therefore, the reaction temperature during the reduction of the nickel hydroxide is set at a level of not less than 55. and preferably not less than 60° C. in the production method according to the present invention.

In particular, the nickel powder produced by bringing the foregoing nickel hydroxide into contact with an aqueous hydrazine solution maintained at a temperature of not less than 55° C., preferably not less than 60° C. to thus reduce the nickel hydroxide has a uniform particle size as determined by the observation with an SEM and the total content of impurities, derived from the raw materials for the reaction, consisting of alkali metals, alkaline earth metals, transition metals (except for nickel) belonging to the fourth period of the Periodic Table, sulfur and chlorine in the resulting nickel powder is reduced to a level of not more than 600 ppm.

The production method according to the present invention employs a nickel hydroxide-containing slurry prepared by adding an aqueous nickel salt solution to an aqueous alkali metal hydroxide solution. To make the particle size distribution of the resulting nickel powder narrower, however, the aqueous nickel salt solution preferably comprises a nickel complex. This nickel complex may be added to the aqueous solution after separately preparing the nickel complex, but the complex is preferably formed in the aqueous nickel salt solution. In case where the nickel complex is formed in the aqueous nickel salt solution, it is preferred to use a water-soluble compound carrying a carboxyl group and/or an amino group. Such a compound can easily form a complex with nickel and can make the particle size of nickel more uniform.

Such nickel complex may be formed in an aqueous nickel salt solution by dissolving a nickel salt and a water-soluble compound carrying a carboxyl group and/or an amino group in water in any order, or dissolving a water-soluble compound carrying a carboxyl group and/or an amino group in an aqueous nickel salt solution, or dissolving a nickel salt in an aqueous solution of a water-soluble compound carrying a carboxyl group and/or an amino group. In short, it is necessary in the present invention to prepare an aqueous solution containing a nickel salt and a water-soluble compound carrying a carboxyl group and/or an amino group.

Specific examples of the foregoing water-soluble compound carrying a carboxyl group and/or an amino group include ethylenediaminetetraacetic acid, acetic acid, oxalic acid, malonic acid, salicylic acid, thioglycolic acid, glycine, ethylenediamine, alanine, citric acid, glutamic acid, lactic acid, malic acid, tartaric acid and triethanolamine, When the nickel complex is formed in the aqueous nickel salt solution, the amount of the water-soluble compound carrying a carboxyl group and/or an amino group to be added to the aqueous solution ranges from 0.005 to 0.5 and more preferably 0.01 to 0.1 as expressed in terms of the molar ratio with respect to the nickel salt present in the aqueous nickel salt solution. The use of the water-soluble compound in such an amount permits the production of nickel powder. having a narrower particle size distribution and simultaneously permits the achievement of well-balanced cost performance.

In the production method of the present invention, the nickel powder obtained after the reducing reaction may be subjected to a disaggregation or disintegration treatment to give monodispersed nickel powder and therefore, it is further preferred to carry out such a disaggregation treatment. This disaggregation treatment may, for instance, be a high speed rotary impaction-pulverization treatment wherein nickel powder is pulverized by leading the powder to collide with a rotatable part rotating at a high speed; a media-stirring pulverization treatment in which nickel powder is stirred together with, for instance, beads to thus pulverize the same; and a high hydraulic disaggregation treatment and a jet impaction treatment in which two jets of nickel particle-containing slurry are led to collide with each other from different two directions at a high hydraulic pressure to thus pulverize the same.

Examples of devices for carrying out such disaggregation treatments are a high speed moving body-impaction type gas flow pulverizer, an impaction type pulverizer, a cage mill, a medium-stirring type mill, an axial flow mill, and a jet-impaction device. More specifically, there may be listed, for instance, Super Hybrid Mill (available from Ishikawajima-Harima Heavy Industries Co., Ltd.), Jet Mill (available from Ebara Corporation), Super Mass Colloider (available from Masuko Sangyo Co., Ltd.), Beads Mill (available from Irie Shokai Co., Ltd.), Altimizer (available from Sugino Machine Mfg. Co., Ltd.), NC Mill (available from Ishii Pulverizer Mfg. Co., Ltd.), Disintegrator (available from Otsuka Tekko Co., Ltd.), ACM Pulverizer (available from Hosokawa Micron Co., Ltd.), Turbo Mill (available from Matsubo Co., Ltd.), Super Micron (available from Hosokawa Micron Co., Ltd.), Micross (available from Nara Machine Mfg. Co., Ltd.), New Cosmomyzer (available from Nara Machine Mfg. Co., Ltd.), Fine Victor Mill (available from Hosokawa Micron Co., Ltd.), Ecoprex (available from Hosokawa Micron Co., Ltd.), CF Mill (available from Ube Industries, Ltd.), Hybridizer (available from Nara Machine Mfg. Co., Ltd.), Pin Mill (available from Alpinae Co., Ltd.), Pressure Homogenizer (available from Nippon Precision Machine Mfg. Co., Ltd.), Harrel Homogenizer (available from Kokusan Seiko Co., Ltd.), Mechano Fusion System (available&from Hosokawa Micron Co., Ltd.) and Sand Mill (available from Yodo Casting Co., Ltd.).

The present invention will more specifically be described in more detail below with reference to the following Examples and Comparative Examples.

EXAMPLE 1

An aqueous solution prepared by dissolving 44.8 kg of nickel sulfate hexahydrate (grade: 22.2% by mass) and 1.8 kg of citric acid monohydrate in 80 L of pure water was slowly dropwise added to 100 L of a 200 g/L aqueous sodium hydroxide solution while maintaining the temperature of the solutions at 60° C. to thus separate out nickel hydroxide. Then to the resulting slurry, there was gradually added 30 kg of hydrazine monohydrate over 30 minutes, while maintaining the temperature of the slurry at 60° C., to thus reduce the nickel hydroxide into nickel, followed by washing the resulting. nickel powder with pure water till the pH value of the wash liquid was reduced to a level of not more than 9, filtration, drying and then subjecting the resulting powder to a disaggregation treatment in Pulverizer AP-1SH Model equipped with a knife-type hammer (available from Hosokawa Micron Co., Ltd.) at a rotational speed of 2500 rpm to thus give nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.58 μm, the number of particles whose particle size was greater than 0.69 m (0.58× 1.2=0.696) was found to be 53 and the number of particles whose particle size was less than 0.47 μm (0.58×0.8=0.464) was found to be 44.

Separately, 0.1 g of this nickel powder was mixed with a 0.1% aqueous solution of SN Dispersant 5468 (available from Sun Nopuco Co., Ltd.) and then the mixture was dispersed by using Ultrasonic Homogenizer (US-300T available from Nippon Precision Machine Mfg. Co., Ltd.) for 5 minutes. Thereafter, there were calculated the particle size ($D_{50}$) corresponding to a cumulative distribution of undersize particles equal to 50% and the maximum particle size ($D_{max}$) of the particle size distribution obtained by determining the volume distribution by using a laser diffraction scattering type particle size distribution-determining device: Micro Trac HRA 9320-X100 Model (available from Leeds+Northrup Company). As a result, $D_{50}$ was found to be 0.66 μm, $D_{max}$ was found to be 1.46 μm and therefore, the ratio: $D_{max}/D_{50}$ was estimated to be 2.2.

Moreover, the total concentration of sodium and potassium was estimated to be 262 ppm, that of magnesium and calcium was found to be 51 ppm, the concentration of sulfur was found to be 80 ppm, that of chlorine was found to be 8 ppm, the total concentration of transition metals (except for nickel) belonging to the fourth period of the Periodic Table (titanium, vanadium, chromium, manganese, iron, cobalt, copper and zinc) was found to be 89 ppm and thus the total content of these impurities was estimated to be 490 ppm.

To 50 parts by mass of this nickel powder, there were added 5 parts by mass of ethyl cellulose, 60 parts by mass of mineral spirits and 35 parts by mass of butyl carbitol, followed by kneading the resulting mixture in a three-roll mill to give a paste. Multilayer ceramic capacitors were produced, after firing, using the resulting conductive paste. In this connection, each ceramic capacitor was composed of dielectric layers having a thickness of 2 μm and inner electrode layers having a thickness of 1.5 μm and had a number of laminated layers of 350 and a size of 2.0×1.25× 1.25 mm. The resulting ceramic capacitors (200 specimens) were inspected for the presence of defects. As a result, the number of specimens suffering from defects of electrical characteristics such as insufficiency in the insulation and dielectric characteristics was found to be 2 and accordingly, the percentage of rejects was found to be 1%.

EXAMPLE 2

An aqueous solution obtained by dissolving 44.8 kg of nickel sulfate hexahydrate (grade: 22.2% by mass) and 2.8 kg of sodium ethylenediaminetetraacetate in 80 L of pure water was gradually dropwise added to 100 L of a 200 g/L aqueous sodium, hydroxide solution while maintaining the temperature of the solutions at 60° C. to thus separate out nickel hydroxide. Then to the resulting slurry, there was gradually added 42 kg of hydrazine monohydrate over 20 minutes, while maintaining the temperature of the slurry at 6.0, to thus reduce the nickel hydroxide into nickel, followed by washing the resulting nickel powder with pure water till the pH value of the wash liquid was reduced to a level of not more than 9, filtration, drying and then subjecting the resulting powder to a disaggregation treatment in Hybridizer NHS-3 Model (available from Nara Machine Mfg. Co., Ltd.) at a rotational speed of 4000 rpm for 5 minutes to thus give nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.52 $\mu$m, the number of particles whose particle size was greater than 0.62 $\mu$m (0.52×1.2 =0.624) was found to be only 55 and the number of particles whose particle size was less than 0.42 $\mu$m (0.52×0.8=0.416) was found to be only 28.

Separately, 0.1 g of this nickel powder was mixed with a 0.1% aqueous solution of SN Dispersant 5468 (available from Sun Nopuco Co., Ltd.) and then the mixture was dispersed by using Ultrasonic Homogenizer (US-300T available from Nippon Precision Machine Mfg. Co., Ltd.) for 5 minutes. Thereafter, there were calculated the particle size ($D_{50}$) corresponding to a cumulative distribution of undersize particles equal to 50% and the maximum particle size ($D_{max}$) of the particle size distribution obtained by determining the volume distribution by using a laser diffraction scattering type particle size distribution-determining device: Micro Trac HRA 9320-X100 Model (available from Leeds+Northrup Company). As a result, $D_{50}$ was found to be 0.57 $\mu$m, $D_{max}$ was found to be 1.31 $\mu$m and therefore, the ratio: $D_{max}/D_{50}$ was estimated to be 2.3.

Moreover, the total concentration of sodium and potassium was estimated to be 24.8 ppm, that of magnesium and calcium was found to be 55 ppm, the concentration of sulfur was found to be 94 ppm, that of chlorine was found to be 10 ppm, the total concentration of transition metals (except for nickel) belonging to the fourth period of the Periodic Table was found to be 58 ppm and thus the total content of these impurities was estimated to be 565 ppm.

To 50 parts by mass of this nickel powder, there were added 5 parts by mass of ethyl cellulose, 60 parts by mass of mineral spirits and 35 parts by mass of butyl carbitol, followed by kneading the resulting mixture in a three-roll mill to give a paste. Multilayer ceramic capacitors were produced, after firing, using the resulting conductive paste. In this connection, each ceramic capacitor was composed of dielectric layers having a thickness of 2 $\mu$m and inner electrode layers having a thickness of 1.5 $\mu$m and had a number of laminated layers of 350 and a size of 2.0×1.25× 1.25 mm. The resulting ceramic capacitors (200 specimens) were inspected for the presence of defects. As a result, the number of specimens suffering from defects of electrical characteristics such as insufficiency in the insulation and dielectric characteristics was found to be 2 and accordingly, the percentage of rejects was found to be 1%.

EXAMPLE 3

An aqueous solution obtained by dissolving 44.8 kg of nickel sulfate hexahydrate (grade: 22.2% by mass) and 0.65 kg of glycine in 80 L of pure water was gradually dropwise added to 100 L of a 200 g/L aqueous sodium hydroxide solution while maintaining the temperature of the solutions at 70° C. to thus separate out nickel hydroxide. Then to the resulting slurry, there was gradually added 42 kg of hydrazine monohydrate over 30 minutes, while maintaining the temperature of the slurry at 70, to thus reduce the nickel hydroxide into nickel, followed by washing the resulting nickel powder with pure water till the pH value of the wash liquid was reduced to a level of not more than 9, filtration, drying and then subjecting the resulting powder to a disaggregation treatment in a jet mill: Ebara Tryade Jet PM100 Model (available from Ebara Corporation) at an air pressure of 6 kg/cm$^2$, 2 kg/hr to thus give nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.54 $\mu$m, the number of particles whose particle size was greater than 0.64 $\mu$m (0.54×1.2=0.648) was found to be only 36 and the number of particles whose particle size was less than 0.44 $\mu$m (0.54×0.8=0.432) was found to be only 51.

Separately, 0.1 g of this nickel powder was mixed with a 0.1% aqueous solution of SN Dispersant 5468 (available from Sun Nopuco Co., Ltd.) and then the mixture was dispersed by using Ultrasonic Homogenizer (US-300T available from Nippon Precision Machine Mfg. Co., Ltd.) for 5 minutes. Thereafter, there were calculated the particle size ($D_{50}$) corresponding to a cumulative distribution of undersize particles equal to 50% and the maximum particle size ($D_{max}$) of the particle size distribution obtained by determining the volume distribution by using a laser diffraction scattering type particle size distribution-determining device: Micro Trac HRA 9320-X100 Model (available from Leeds+Northrup Company). As a result, $D_{50}$ was found to be 0.66 $\mu$m, $D_{max}$ was found to be 1.36 $\mu$m and therefore, the ratio: $D_{max}/D_{50}$ was estimated to be 2.1.

Moreover, the total concentration of sodium and potassium was estimated to be 40 ppm, that of magnesium and calcium was found to be 46 ppm, the concentration of sulfur was found to be 45 ppm, that of chlorine was found to be 7 ppm, the total concentration of transition metals (except for nickel) belonging to the fourth period of the Periodic Table was found to be 47 ppm and thus the total content of these impurities was estimated to be 185 ppm.

To 50 parts by mass of this nickel powder, there were added 5 parts by mass of ethyl cellulose, 60 parts by mass of mineral spirits and 35 parts by mass of butyl carbitol, followed by kneading the resulting mixture in a three-roll mill to give a paste. Multilayer ceramic capacitors were produced, after firing, using the resulting conductive paste. In this connection, each ceramic capacitor was composed of dielectric layers having a thickness of 2 $\mu$m and inner electrode layers having a thickness of 1.5 $\mu$m and had a number of laminated layers, of 350 and a size of 2.0×1.25× 1.25 mm. The resulting ceramic capacitors (200 specimens) were inspected for the presence of defects. As a result, the number of specimens suffering from defects of electrical characteristics such as insufficiency in the insulation and dielectric characteristics was found to be 2 and accordingly, the percentage of rejects was found to be 1%.

Comparative Example 1

To an aqueous solution obtained by dissolving 44.8 kg of nickel sulfate hexahydrate (grade: 22.2% by mass) in 80 of pure water there; was gradually dropwise added 100 L of a 200 g/L aqueous sodium hydroxide solution while maintaining the temperature of the solutions at 50° C. to thus separate out nickel hydroxide. Then to the resulting slurry, there was gradually added 42 kg of hydrazine monohydrate over 20 minutes, while maintaining the temperature of the slurry at 50° C., to thus reduce the nickel hydroxide into nickel, followed by washing the resulting nickel powder with pure water till the pH value of the wash liquid was reduced to a level of not more than 9, filtration and drying to thus give nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.61 μm, the number of particles whose particle size was greater than 0.73 μm (0.61×1.2=0.732) was found to be 133 and the number of particles whose particle size was less than 0.49 μm (0.61× 0.8=0.488) was found to be 85.

Separately, 0.1 g of this nickel powder was mixed with a 0.1% aqueous solution of SN Dispersant 5468 (available from Sun Nopuco Co., Ltd.) and then the mixture was dispersed by using Ultrasonic Homogenizer (US-300T available from Nippon Precision Machine Mfg. Co., Ltd.) for 5 minutes. Thereafter, there were calculated the particle size ($D_{50}$) corresponding to a cumulative distribution of undersize particles equal to 50% and the maximum particle size ($D_{max}$) of the particle size distribution obtained by determining the volume distribution by using a laser diffraction scattering type particle size distribution-determining device: Micro Trac HRA 9320-X100 Model (available from seeds+Northrup Company). As a result, $D_{50}$ was found to be 1.10 μm, $D_{max}$ was found to be 6.27 μm and therefore, the ratio: $D_{max}/D_{50}$ was estimated to be 5.7.

Moreover, the total concentration of sodium and potassium was estimated to be 380 ppm, that of magnesium and calcium was found to be 168 ppm, the concentration of sulfur was found to be 79 ppm, that of chlorine was found to be 8 ppm, the total concentration of transition metals (except for nickel) belonging to the fourth period of the Periodic Table was found to be 101 ppm and thus the total content of these impurities was estimated to be 7.36 ppm.

To 50 parts by mass of this nickel powder, there were added 5 parts by mass of ethyl cellulose, 60 parts by mass of mineral spirits and 35 parts by mass of butyl carbitol, followed by kneading the resulting mixture in a three-roll mill to give a paste. Multilayer ceramic capacitors were produced, after firing, using the resulting conductive paste.

In this connection, each ceramic capacitor was composed of dielectric layers having a thickness of 2 μm and inner electrode layers having a thickness of 1.5 μm and had a number of laminated layers of 350 and a size of 2.0×1.25× 1.25 mm.

The resulting ceramic capacitors (200 specimens) were inspected for the presence of defects. As a result, the number of specimens suffering from defects of electrical characteristics such as insufficiency in the insulation and dielectric characteristics was found to be 12 and accordingly, the percentage of rejects was found to be 6%.

Comparative Example 2

An aqueous solution obtained by dissolving 44.8 kg of nickel sulfate hexahydrate (grade: 22.2% by mass) in 80 L of pure water was gradually dropwise added to 100 L of a 200 g/L aqueous sodium hydroxide solution while maintaining the temperature of the solutions at 50° C. to thus separate out nickel hydroxide. Then to the resulting slurry, there was gradually added 42 kg of hydrazine monohydrate over 20 minutes, while maintaining the temperature of the slurry at 50° C., to thus reduce the nickel hydroxide into nickel, followed by washing the resulting nickel powder with pure water till the pH value of the wash liquid was reduced to a level of not more than 9, filtration, drying and then subjecting the resulting powder to a disaggregation treatment in Pulverizer AP-1SH Model equipped with a knife-type hammer (available from Hosokawa Micron Co., Ltd.) at a rotational speed of 2500 rpm to thus give nickel powder.

The resulting nickel powder was observed by an SEM with a magnification of ×10000 to determine the particle sizes of 1500 particles, in all, present in 5 visual fields randomly selected. As a result, the average particle size of these particles was found to be 0.59 μm, the number of particles whose particle size was greater than 0.70 μm (0.59×1.2=0.708) was found to be 99 and the number of particles whose particle size was less than 0.48 μm (0.59× 0.8=0.472) was found to be 78.

Separately, 0.1 g of this nickel powder was mixed with a 0.1% aqueous solution of SN Dispersant 5468 (available from Sun Nopuco Co., Ltd.) and then the mixture was dispersed by using Ultrasonic Homogenizer (US-300T available from Nippon Precision Machine Mfg. Co., Ltd.) for 5 minutes. Thereafter, there were calculated the particle size ($D_{50}$) corresponding to a cumulative distribution of undersize particles equal to 50% and the maximum particle size ($D_{max}$) of the particle size distribution obtained by determining the volume distribution by using a laser diffraction scattering type particle size distribution-determining device: Micro Trac HRA 9320-X100 Model (available from Leeds+Northrup Company). As a result, $D_{50}$ was found to be 0.88 μm, $D_{max}$ was found to be 2.75 μm and therefore, the ratio: $D_{max}/D_{50}$ was estimated to be 3.1.

Moreover, the total concentration of sodium and potassium was estimated to be 350 ppm, that of magnesium and calcium was found to be 150 ppm, the concentration of sulfur was found to be 72 ppm, that of chlorine was found to be 11 ppm, the total concentration of transition metals (except for nickel) belonging to the fourth period of the Periodic Table was found to be 66 ppm and thus the total content of these impurities was estimated to be 649 ppm.

To 50 parts by mass of this nickel powder, there were added 5 parts by mass of ethyl cellulose, 60 parts by mass of mineral spirits and 35 parts by mass of butyl carbitol, followed by kneading the resulting mixture in a three-roll mill to give a paste. Multilayer ceramic capacitors were produced, after firing, using the resulting conductive paste.

In this connection, each ceramic capacitor was composed of dielectric layers having a thickness of 2 μm and inner electrode layers having a thickness of 1.5 μm and had a number of laminated layers of 350 and a size of 2.0×1.25× 1.25 mm.

The resulting ceramic capacitors (200 specimens) were inspected for the presence of defects. As a result, the number of specimens suffering from defects of electrical characteristics such as insufficiency in the insulation and dielectric characteristics was found to be 7 and accordingly, the percentage of rejects was found to be 3.5%.

INDUSTRIAL APPLICABILITY

The nickel powder according to the present invention can suitably be used, in particular, in a conductive paste for use in making a thin inner electrode free of any projection for multilayer ceramic capacitors.

What is claimed is:

1. A method for the production of nickel powder comprising the step of bringing a slurry, containing nickel hydroxide, which is prepared by adding an aqueous nickel salt solution containing a nickel complex to an aqueous solution of an alkali metal hydroxide, into contact with a hydrazine reducing agent under the temperature conditions of not less than 55° C. to reduce the nickel hydroxide.

2. The method as set forth in claim 1, wherein after carrying out the reducing reaction, the resulting nickel powder is subjected to a disaggregation treatment to obtain monodispersed nickel powder.

3. The method as set forth in claim 1, wherein the aqueous nickel salt solution containing the nickel complex is prepared by forming an aqueous solution containing a nickel salt and a water-soluble compound carrying a carboxyl group and/or an amino group.

4. The method as set forth in claim 3, wherein after carrying out the reducing reaction, the resulting nickel powder is subjected to a disaggregation treatment to obtain monodispersed nickel powder.

* * * * *